(12) United States Patent
Shinzawa

(10) Patent No.: US 8,499,807 B2
(45) Date of Patent: Aug. 6, 2013

(54) PNEUMATIC RUN FLAT TIRE

(75) Inventor: Tatsurou Shinzawa, Hiratsuka (JP)

(73) Assignee: The Yokohama Rubber Co., Ltd. (JP)

(*) Notice: Subject to any disclaimer, the term of this patent is extended or adjusted under 35 U.S.C. 154(b) by 97 days.

(21) Appl. No.: 13/282,023

(22) Filed: Oct. 26, 2011

(65) Prior Publication Data
US 2012/0103494 A1 May 3, 2012

(30) Foreign Application Priority Data

Nov. 2, 2010 (JP) ................................ 2010-245963

(51) Int. Cl.
*B60C 17/00* (2006.01)
*B60C 3/00* (2006.01)
*B60C 15/06* (2006.01)

(52) U.S. Cl.
USPC ........... 152/454; 152/517; 152/546; 152/547; 152/531; 152/527

(58) Field of Classification Search
USPC .................. 152/454, 517, 546, 547, 531, 527
See application file for complete search history.

(56) References Cited

U.S. PATENT DOCUMENTS 7,255,146 B2 * 8/2007 Kirby ............................ 152/517
7,409,974 B2 * 8/2008 Colantonio et al. ...... 152/517 X

FOREIGN PATENT DOCUMENTS

JP     2005-343372     12/2005

* cited by examiner

*Primary Examiner* — Adrienne C Johnstone
(74) *Attorney, Agent, or Firm* — Thorpe North & Western LLP

(57) ABSTRACT

A reinforcing rubber layer having a falcated cross-section disposed on an inner side in a tire width direction of the carcass layer in a side wall portion. An angle θ, with respect to the total tire width SW and a tire cross-section height SH, satisfies a relationship (SH/SW×6+3)°≦θ≦(SH/SW×6+8)°. Additionally, a height H1 of a bead filler is from 15 to 35% of the tire cross-section height SH and a height H2 of a maximum thickness position of the reinforcing rubber layer is from 35 to 55% of the tire cross-section height SH.

18 Claims, 1 Drawing Sheet

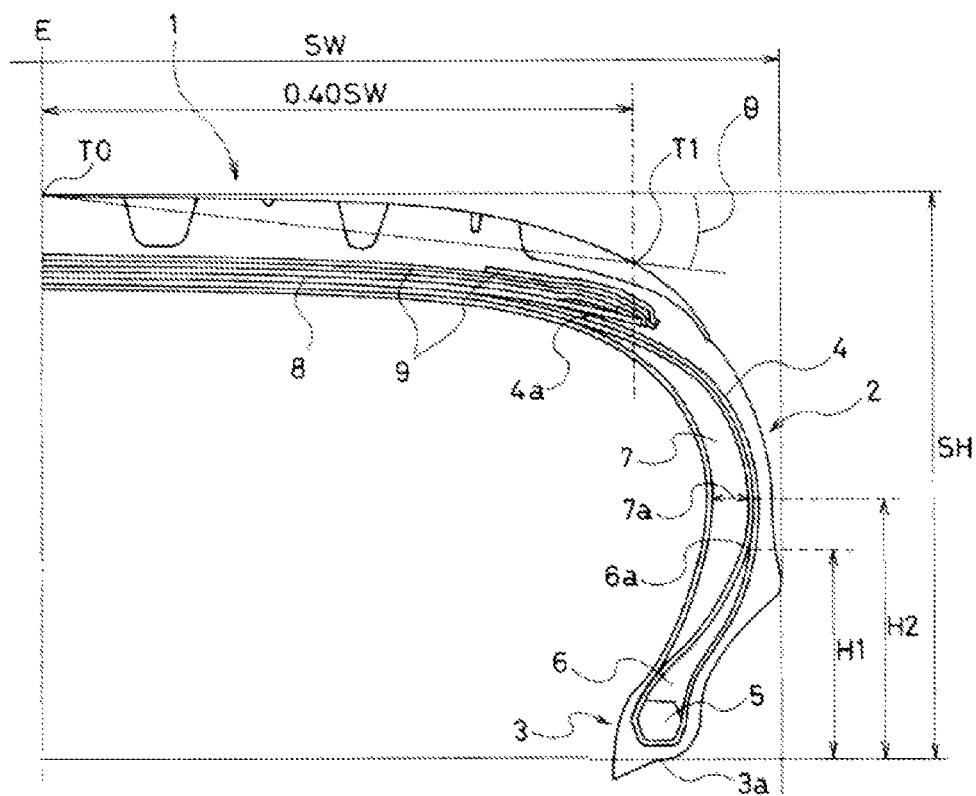

PNEUMATIC RUN FLAT TIRE

PRIORITY CLAIM

Priority is claimed to Japan Patent Application Serial No. 2010-245963 filed on Nov. 2, 2010.

BACKGROUND

1. Technical Field

The present technology relates to a pneumatic run flat tire, and particularly Relates to a pneumatic run flat tire in which tire weight can be reduced while maintaining run-flat durability, and which is configured so that riding comfort when regular traveling is enhanced.

2. Related Art

Conventionally, in run flat tires provided with a reinforcing rubber layer having a falcated cross-section on an inner surface side of a side wall portion, methods such as increasing a thickness of the reinforcing rubber layer and using a rubber with a higher hardness for the reinforcing rubber layer have been used in order to ensure durability when run-flat traveling. However, there are problems with tires having run-flat durability enhanced in this way such as increased rolling resistance caused by increased weight, and worsening of riding comfort when regular traveling caused by increased side stiffness.

Conventionally, using a particular rubber as the material of the reinforcing rubber layer and compounding short fiber in the material of the reinforcing rubber layer have been proposed as measures to enhance run-flat durability while enhancing riding comfort when regular traveling (see Japanese Unexamined Patent Application Publication No. 2005-343372A). However, with both of these proposals, the enhancement of riding comfort when regular traveling and the reduction of tire weight is insufficient, and there is still room for improvement.

SUMMARY

The present technology addresses the shortcomings described above and provides a pneumatic run flat tire in which tire weight can be reduced while maintaining run-flat durability, and which is configured so that riding comfort when regular traveling is enhanced.

A pneumatic run flat tire of the present technology includes a carcass layer mounted between a pair of left and right bead portions, a belt layer disposed on an outer circumferential side of the carcass layer in a tread portion, and a reinforcing rubber layer having a falcated cross-section disposed on an inner side in a tire width direction of the carcass layer in a side wall portion. In a tire meridian direction cross-section, a point where a tire equator plane meets a tread surface is T0, and a point where a straight line drawn parallel to the tire equator plane from a position 40% of a total tire width SW starting from the point T0 meets the tread surface is T1. An angle θ formed by a straight line joining the point T0 and the point T1 with respect to the tire width direction, with respect to the total tire width SW and a tire cross-section height SH, satisfies a relationship $(SH/SW \times 6+3)° \leq \theta \leq (SH/SW \times 6+8)°$. A height H1 of an outer peripheral edge of the bead filler from a bead heel is from 30 to 50% of the tire cross-section height SH. A height H2 of a maximum thickness position of the reinforcing rubber layer from the bead heel is from 35 to 55% of the tire cross-section height SH.

As a result of diligent research into a pneumatic run flat tire including a reinforcing rubber layer having a falcated cross-section disposed on an inner side in a tire width direction of the carcass layer in a side wall portion, the present inventors discovered that when a thickness of the reinforcing rubber layer is reduced, the side wall portion deforms greatly when run-flat traveling with a position where the carcass layer expands most to the outer side in the tire width direction (position of maximum tire width) as a flex point and, as a result, collapsing of the reinforcing rubber layer is advanced.

Therefore, in the present technology, deformation near the bead portion is suppressed and the flex points in the side wall portion are moved to the tread portion side when run-flat traveling by configuring the height H1 of the outer peripheral edge of the bead filler to be from 30 to 50% of the tire cross-section height SH and the height H2 of the maximum thickness position of the reinforcing rubber layer to be from 35 to 55% of the tire cross-section height SH.

Additionally, in the present technology, an angle θ formed by a straight line joining a point T0, where a tire equator plane meets a tread surface, and a point T1, where a straight line drawn parallel to the tire equator plane from a position 40% of a total tire width SW starting from the point T0 meets the tread surface, with respect to the tire width direction satisfies a relationship $(SH/SW \times 6+3)° \leq \theta \leq (SH/SW \times 6+8)°$ with respect to the total tire width SW and a tire cross-section height SH. This configuration also contributes to the moving of the flex points in the side wall portion to the tread portion side when run-flat traveling.

Thus, according to the present technology, the disposal of the bead filler and the reinforcing rubber layer is stipulated and the tread profile is optimized. Therefore, the flex points in the side wall portion are moved to the tread portion side when run-flat traveling. As a result, even when the reinforcing rubber layer is thinner than that in conventional tires, collapsing of the reinforcing rubber layer can be prevented and run-flat durability can be maintained. Therefore, it is possible to reduce tire weight while maintaining run-flat durability and, furthermore, enhance riding comfort when regular traveling.

In the present technology, a tan δ at 60° C. of rubber forming the reinforcing rubber layer is preferably in a range from 0.02 to 0.15, and a dynamic elastic modulus at 60° C. is preferably in a range from 5 to 20 MPa. As a result, run-flat durability can be enhanced and riding comfort when regular traveling can be enhanced.

In the present technology, a tan δ at 60° C. of rubber forming the bead filler is preferably in a range from 0.05 to 0.25, and a dynamic elastic modulus at 60° C. is preferably in a range from 5 to 20 MPa. As a result, riding comfort when regular traveling can be enhanced while maintaining run-flat durability.

In the present technology, a cross-sectional area of the reinforcing rubber layer in a tire meridian direction cross-section is preferably from 190 to 270% of a cross-sectional area of the bead filler. As a result, riding comfort can be enhanced while maintaining run-flat durability.

BRIEF DESCRIPTION OF THE DRAWING

FIG. 1 is a meridian cross-sectional view illustrating a pneumatic tire according to an embodiment of the present technology.

DETAILED DESCRIPTION

FIG. 1 illustrates a pneumatic run flat tire according to an embodiment of the present technology, wherein 1 is a tread portion, 2 is a side wall portion, and 3 is a bead portion. A carcass layer 4 including a plurality of reinforcing cords extending in a tire radial direction is mounted between a pair of left and right bead portions 3. Ends of the carcass layer 4 are folded around the bead cores 5 from a tire inner side to a tire outer side. A bead filler 6 formed from a rubber composition having a high degree of hardness is disposed on peripheries of the bead cores 5, and the bead filler 6 is encompassed by the carcass layer 4.

A reinforcing rubber layer 7 having a falcated cross-section and being formed from a rubber composition having a high degree of hardness is disposed on an inner side in a tire width direction of the carcass layer 4 in the side wall portion 2. A thickness of the reinforcing rubber layer 7 is greatest at a center portion in the tire radial direction and gradually declines toward the bead portion side and the tread portion side.

A plurality of layers of a belt layer 8 is embedded on an outer circumferential side of the carcass layer 4 in the tread portion 1. These belt layers 8 include a plurality of reinforcing cords that incline with respect to a tire circumferential direction, and the reinforcing cords are disposed between the layers so as to intersect each other. A belt cover layer 9 formed by wrapping reinforcing cords in the tire circumferential direction is disposed on an outer circumferential side of the belt layers 8.

With a pneumatic run flat tire described above, when tire weight is reduced and riding comfort is enhanced by reducing a thickness of the reinforcing rubber layer 7, a shape of a tire meridian direction cross-section of the present technology is configured as described below in order to prevent the side wall portion 2 from deforming greatly when run-flat traveling due to the reinforcing rubber layer 7 being thin, flex points concentrating at a tire maximum width position, and the reinforcing rubber layer 7 collapsing due to large amounts of deformation thereof.

As illustrated in FIG. 1, in a tire meridian direction cross-section, a point where a tire equator plane E meets a tread surface is T0, and a point where a straight line drawn parallel to the tire equator plane E from a position 40% of a total tire width SW starting from the point T0 meets the tread surface is T1. Here, an angle $\theta$ formed by a straight line joining the point T0 and the point T1 with respect to the tire width direction, with respect to the total tire width SW and a tire cross-section height SH, satisfies a relationship $(SH/SW \times 6+3)° \leq \theta \leq (SH/SW \times 6+8)°$. In other words, the angle $\theta$ is defined by oblateness. Specifically, the angle $\theta$ is in a range from 4.5 to 9.5° when the oblateness is 25% (SH/SW=0.25), the angle $\theta$ is in a range from 4.8 to 9.8° when the oblateness is 30% (SH/SW=0.30), the angle $\theta$ is in a range from 5.1 to 10.1° when the oblateness is 35% (SH/SW=0.35), the angle $\theta$ is in a range from 5.4 to 10.4° when the oblateness is 40% (SH/SW=0.40), the angle $\theta$ is in a range from 5.7 to 10.7° when the oblateness is 45% (SH/SW=0.45), the angle $\theta$ is in a range from 6.0 to 11.0° when the oblateness is 50% (SH/SW=0.50), and the angle $\theta$ is in a range from 6.3 to 11.3° when the oblateness is 55% (SH/SW=0.55). In each case, the angle $\theta$ is larger than that found in conventional tires. As a result, belt buckling when run-flat traveling can be suppressed and run-flat durability can be enhanced. If the angle $\theta$ is smaller than $(SH/SW \times 6+3)°$, belt buckling when run-flat traveling cannot be suppressed and run-flat durability will decline. If the angle $\theta$ exceeds $(SH/SW \times 6+8)°$, significant enhancements in run-flat durability are not expected and, furthermore, the tire will become prone to uneven wear.

A height H1 of an outer peripheral edge 6a of the bead filler 6 from a bead heel 3a is from 30 to 50% of the tire cross-section height SH. By configuring the height of the outer peripheral edge 6a of the bead filler 6 to be greater than that in conventional tires as described above, riding comfort when regular traveling can be enhanced while maintaining run-flat durability. If the height H1 is less than 30% of the tire cross-section height SH, stiffness of the bead portion 3 will be insufficient and run-flat durability will decline. If the height H1 exceeds 50% of the tire cross-section height SH, riding comfort when regular traveling will decline.

A height H2 of a maximum thickness position 7a of the reinforcing rubber layer 7 from the bead heel 3a is from 35 to 55% of the tire cross-section height SH. By configuring the height of the maximum thickness position 7a of the reinforcing rubber layer 7 to be less than that in conventional tires as described above, run-flat durability can be enhanced. If the height H2 is less than 35% of the tire cross-section height SH, stiffness of the side wall portion 2 will be insufficient and run-flat durability will decline. If the height H2 exceeds 55% of the tire cross-section height SH, riding comfort when regular traveling will decline.

Note that in the present technology, tire dimensions are measured in accordance with tire dimension measuring methods stipulated by the standard that the pneumatic tire is based on (e.g. JATMA (Japanese Automotive Tyre Manufacturers Association), ETRTO (European Tyre and Rim Technical Organisation), or TRA (Tire and Rim Association)).

In the present technology, a tan $\delta$ at 60° C. of rubber forming the reinforcing rubber layer 7 is preferably in a range from 0.02 to 0.15, and more preferably in a range from 0.02 to 0.10. Thereby, run-flat durability can be enhanced. If the tan $\delta$ of the reinforcing rubber layer 7 is less than 0.02, practical manufacturing will be troublesome. If the tan $\delta$ of the reinforcing rubber layer 7 exceeds 0.15, run-flat durability cannot be sufficiently enhanced.

Additionally, a dynamic elastic modulus E1 at 60° C. of the rubber forming the reinforcing rubber layer 7 is preferably in a range from 5 to 20 MPa, and more preferably in a range from 5 to 15 MPa. Thereby, riding comfort when regular traveling can be enhanced. If the dynamic elastic modulus E1 is less than 5 MPa, run-flat durability cannot be sufficiently enhanced. If the dynamic elastic modulus E1 exceeds 20 MPa, riding comfort when regular traveling will decline.

In the present technology, a tan $\delta$ at 60° C. of rubber forming the bead filler 6 is preferably in a range from 0.05 to 0.25, and more preferably in a range from 0.02 to 0.20. Thereby, run-flat durability can be enhanced. If the tan $\delta$ of the bead filler 6 is less than 0.02, practical manufacturing will be troublesome. If the tan $\delta$ of the bead filler 6 exceeds 0.25, run-flat durability cannot be sufficiently enhanced.

Additionally, a dynamic elastic modulus E2 at 60° C. of the rubber forming the bead filler 6 is preferably in a range from 5 to 20 MPa, and more preferably in a range from 5 to 15 MPa. Thereby, riding comfort when regular traveling can be enhanced. If the dynamic elastic modulus E2 is less than 5 MPa, run-flat durability cannot be sufficiently enhanced. If the dynamic elastic modulus E2 exceeds 20 MPa, riding comfort when regular traveling will decline.

In the present technology, "tan $\delta$" refers to a tan $\delta$ measured using a viscoelasticity spectrometer (manufactured by Toyo Seiki Seisaku-sho, Ltd.) under the following conditions: 10% initial distortion; 2% amplitude; and 20 Hz frequency. "Dynamic elastic moduli E1 and E2" refer to moduli measured using a viscoelasticity spectrometer (manufactured by Toyo Seiki Seisaku-sho, Ltd.) under the following conditions: 10% static distortion; ±2% dynamic distortion; and 20 Hz frequency. In the present technology, the dynamic elastic modulus E1 at 60° C. of the rubber forming the reinforcing rubber layer 7 and the dynamic elastic modulus E2 at 60° C. of the rubber forming the bead filler 6 preferably satisfy a relationship E1<E2. As a result, a tire inner circumferential side has a greater stiffness than a tire outer circumferential side in the side wall portion 2, the flex points can be moved to the tire outer circumferential side, and run-flat durability can be enhanced. If the size relationship of the dynamic elastic moduli E1 and E2 is E1>E2, a tire outer circumferential side will have a greater stiffness than a tire inner circumferential side in the side wall portion 2, and run-flat durability cannot be sufficiently enhanced.

In the present technology, a cross-sectional area of the reinforcing rubber layer 7 in a tire meridian direction cross-section is preferably from 190 to 270%, and more preferably from 200 to 250% of a cross-sectional area of the bead filler 6. Thereby, riding comfort can be enhanced while maintaining run-flat durability. If the cross-sectional area of the reinforcing rubber layer 7 is less than 190% of the cross-sectional area of the bead filler 6, run-flat durability will decline. If the cross-sectional area of the reinforcing rubber layer 7 exceeds 270% of the cross-sectional area of the bead filler 6, riding comfort when regular traveling will decline.

In the present technology, a turned-up edge 4a of the carcass layer 4 is preferably disposed between the belt layer 8 and the carcass layer 4. When the turned-up edge 4a of the carcass layer 4 is located in the side wall portion 2, there is a risk of failure starting from the turned-up edge 4a when run-flat traveling. Therefore, instead of being located in the side wall portion 2, the carcass layer 4 is extended and the turned-up edge 4a is disposed between the belt layer 8 and the carcass layer 4 of the tread portion 1. Thereby, run-flat durability can be further enhanced.

In the present technology, it is not absolutely necessary to provide the belt cover layer 9, but when the belt cover layer 9 is provided, the belt cover layer 9 is preferably formed from cords that include two types of organic fibers having different properties. Specifically, the belt cover layer 9 is formed from organic fibers that have relatively high shrinkage and low elasticity and organic fibers that have relatively low shrinkage and high elasticity. Thereby, while on one hand a belt cover layer 9 is formed that displays the properties of the organic fibers having high shrinkage and low elasticity when regular traveling, buckling of the tread portion when run-flat traveling can be effectively suppressed due to the properties of the organic fibers having low shrinkage and high elasticity; and run-flat durability, steering stability, and riding comfort can be enhanced. Examples of the organic fibers having high shrinkage and low elasticity as described above include nylon, polyester, and the like; and examples of the organic fibers having low shrinkage and high elasticity include aramid, polyolefin ketone, and the like.

EXAMPLES

Ten types of tires were made for a Conventional Example, Comparative Examples 1 to 4, and Working Examples 1 to 5 with a common tire size of 255/40RF19. Shapes of the tire cross-section, and specifications of the bead filler and the reinforcing rubber layer were configured as shown in Table 1.

The Conventional Example is an example wherein the angle θ and the bead filler height are less, and the reinforcing rubber layer height is greater than the ranges specified in the present technology. Comparative Examples 1 and 2 are examples wherein the bead filler height is outside the range of the present technology. Comparative Example 3 is an example wherein the reinforcing rubber layer height is outside the range of the present technology. Comparative Example 4 is an example wherein the angle θ is outside the range of the present technology.

Working Examples 1 to 5 are all examples in which the tire cross-sectional shape was within the range specified in the present technology. The dynamic elastic modulus and tan δ at 60° C. of the bead filler and the reinforcing rubber layer, and the cross-sectional area of the bead filler and the reinforcing rubber layer were varied in each of Working Examples 1 to 5.

Note that in each of Comparative Examples 1 to 3 and Working Examples 1 to 5, a reinforcing rubber layer with a maximum thickness 3 mm thinner than that used in the Conventional Example was used as the reinforcing rubber layer.

Tire weight, run-flat durability, and riding comfort were evaluated for each of the 10 types of tires according to the methods described below. The results are shown in Table 1.

Tire Weight

The weight of the test tires was measured. Results were indexed with the Comparative Examples being assigned an index value of 100. Smaller index values indicate lower tire weight and, thus, superior results.

Run-Flat Durability

Each test tire was assembled on a wheel with a rim size of 19×9J and mounted on a 2.5 liter class passenger car. A load equivalent to four passengers was applied and the valve core was removed. In this state, the passenger car was driven 80 km. Following driving, the external appearance of the tire and the tire inner surface were visually examined. Tires that appeared to be free of severe damage were indicated with a "○", tires that appeared to have severe damage were indicated with a "⊿", and tires that could not complete the 80 km driving and appeared to have damage near the bead portion were indicated with an "x".

Riding Comfort

Each test tire was assembled on a wheel with a rim size of 19×9J and mounted on a 2.5 liter class passenger car. The tires were inflated to an air pressure of 250 kPa, and riding comfort on a test course was evaluated (sensory evaluation) on a five-point scale. The Comparative Example was assigned a benchmark score of 3. Higher scores indicate superior riding comfort.

TABLE 1

|  |  |  | Conv. Ex. | Comp. Ex. 1 | Comp. Ex. 2 | Comp. Ex. 3 | Comp. Ex. 4 |
|---|---|---|---|---|---|---|---|
| Angle θ1 |  | ° | 5.0 | 6.9 | 6.9 | 6.9 | 4.5 |
| Bead filler | Height H1 | % | 30 | 20 | 60 | 40 | 40 |
|  | Dynamic elastic modulus E1 | MPa | 13.8 | 13.8 | 13.8 | 13.8 | 13.8 |
|  | tan δ |  | 0.18 | 0.18 | 0.18 | 0.18 | 0.18 |
| Reinforcing rubber layer | Height H2 | % | 60 | 45 | 45 | 70 | 45 |
|  | Dynamic elastic modulus E2 | MPa | 14.1 | 14.1 | 14.1 | 14.1 | 14.1 |

TABLE 1-continued

|  |  |  |  |  |  |  |  |
|---|---|---|---|---|---|---|---|
|  | tanδ |  | 0.05 | 0.05 | 0.05 | 0.05 | 0.05 |
|  | Cross-sectional area | % | 300 | 290 | 170 | 230 | 230 |
| Riding comfort |  |  | 3 | 4 | 2+ | 3+ | 3+ |
| Tire weight |  | Index | 100 | 93 | 98 | 95 | 95 |
| Run-flat durability |  | Index | ○ | x | ⊿ | ⊿ | x |

|  |  |  | Working Example 1 | Working Example 2 | Working Example 3 | Working Example 4 | Working Example 5 |
|---|---|---|---|---|---|---|---|
| Angle θ1 |  | ° | 6.9 | 6.9 | 6.9 | 6.9 | 6.9 |
| Bead filler | Height H1 | % | 40 | 40 | 40 | 45 | 35 |
|  | Dynamic elastic modulus E1 | MPa | 13.8 | 30 | 13.8 | 13.8 | 13.8 |
|  | tanδ |  | 0.18 | 0.27 | 0.18 | 0.18 | 0.18 |
| Reinforcing rubber layer | Height H2 | % | 45 | 45 | 45 | 45 | 45 |
|  | Dynamic elastic modulus E2 | MPa | 14.1 | 14.1 | 30 | 14.1 | 14.1 |
|  | tanδ |  | 0.05 | 0.05 | 0.20 | 0.05 | 0.05 |
|  | Cross-sectional area | % | 230 | 230 | 230 | 190 | 270 |
| Riding comfort |  |  | 4− | 3+ | 3+ | 4 | 3+ |
| Tire weight |  | Index | 95 | 95 | 95 | 95 | 95 |
| Run-flat durability |  | Index | ○ | ○ | ○ | ○ | ○ |

Notes to Table 1:
"Conv. Ex." is an abbreviation for "Conventional Example" and
"Comp. Ex." is an abbreviation for "Comparative Example".

As is clear from Table 1, compared to the Conventional Example, in each of Working Examples 1 to 5, tire weight was reduced and riding comfort was enhanced while run-flat durability was maintained. Moreover, these performance characteristics were displayed at high levels. On the other hand, in Comparative Examples 1 to 4, enhancements in run-flat durability, tire weight, and riding comfort were insufficient.

What is claimed is:

1. A pneumatic run flat tire comprising:
   a carcass layer mounted between a pair of left and right bead portions,
   a belt layer disposed on an outer circumferential side of the carcass layer in a tread portion, and
   a reinforcing rubber layer having a falcated cross-section disposed on an inner side in a tire width direction of the carcass layer in a side wall portion; wherein
   in a tire meridian direction cross-section, when a point where a tire equator plane meets a tread surface is T0, and a point where a straight line drawn parallel to the tire equator plane from a position 40% of a total tire width SW starting from the point T0 meets the tread surface is T1, an angle θ formed by a straight line joining the point T0 and the point T1 with respect to the tire width direction satisfies a relationship (SH/SW×6+3)°≦θ≦(SH/SW×6+8)° with respect to the total tire width SW and a tire cross-section height SH; a height H1 of an outer peripheral edge of the bead filler from a bead heel is from 30 to 50% of the tire cross-section height SH; and a height H2 of a maximum thickness position of the reinforcing rubber layer from the bead heel is from 35 to 55% of the tire cross-section height SH.

2. The pneumatic run flat tire according to claim 1, wherein a tan δ at 60° C. of rubber forming the reinforcing rubber layer is in a range from 0.02 to 0.15, and a dynamic elastic modulus at 60° C. is in a range from 5 to 20 MPa.

3. The pneumatic run flat tire according to claim 2, wherein a tan δ at 60° C. of rubber forming the bead filler is in a range from 0.05 to 0.25, and a dynamic elastic modulus at 60° C. is in a range from 5 to 20 MPa.

4. The pneumatic run flat tire according to claim 3, wherein a cross-sectional area of the reinforcing rubber layer in a tire meridian direction cross-section is in a range of from 190 to 270% of a cross-sectional area of the bead filler.

5. The pneumatic run flat tire according to claim 2, wherein a cross-sectional area of the reinforcing rubber layer in a tire meridian direction cross-section is in a range of from 190 to 270% of a cross-sectional area of the bead filler.

6. The pneumatic run flat tire according to claim 1, wherein a tan δ at 60° C. of rubber forming the bead filler is in a range from 0.05 to 0.25, and a dynamic elastic modulus at 60° C. is in a range from 5 to 20 MPa.

7. The pneumatic run flat tire according to claim 1, wherein a cross-sectional area of the reinforcing rubber layer in a tire meridian direction cross-section is in a range of from 190 to 270% of a cross-sectional area of the bead filler.

8. The pneumatic run flat tire according to claim 1, wherein a tan δ at 60° C. of rubber forming the reinforcing rubber layer is in a range from 0.02 to 0.10.

9. The pneumatic run flat tire according to claim 1, wherein a dynamic elastic modulus at 60° C. of the rubber forming the reinforcing rubber layer is in a range from 5 to 15 MPa.

10. The pneumatic run flat tire according to claim 1, wherein a tan δ at 60° C. of rubber forming the bead filler is in a range from 0.02 to 0.20.

11. The pneumatic run flat tire according to claim 1, wherein a dynamic elastic modulus at 60° C. of the rubber forming the bead filler is in a range from 5 to 15 MPa.

12. The pneumatic run flat tire according to claim 1, wherein a dynamic elastic modulus E1 at 60° C. of the rubber forming the reinforcing rubber layer and a dynamic elastic modulus E2 at 60° C. of the rubber forming the bead filler satisfy a relationship E1<E2.

13. The pneumatic run flat tire according to claim 1, wherein a cross-sectional area of the reinforcing rubber layer in a tire meridian direction cross-section is from 200 to 250% of a cross-sectional area of the bead filler.

14. The pneumatic run flat tire according to claim 1, wherein a turned-up edge of the carcass layer is disposed between the belt layer and the carcass layer.

15. The pneumatic run flat tire according to claim 1, further comprising a belt cover layer.

16. The pneumatic run flat tire according to claim 15, wherein the belt cover layer is formed from cords that include two types of organic fibers having different properties.

17. The pneumatic run flat tire according to claim 16, wherein one of the two types of organic fibers has relatively high shrinkage and low elasticity as compared with another of the two types of organic fibers having a relatively low shrinkage and high elasticity.

18. The pneumatic run flat tire according to claim 17, wherein the organic fibers having relatively high shrinkage and low elasticity includes at least one of nylon and polyester; and the organic fibers having relatively low shrinkage and high elasticity includes at least one of aramid and polyolefin ketone.

\* \* \* \* \*